United States Patent
McQuillen et al.

(10) Patent No.: US 10,137,900 B2
(45) Date of Patent: Nov. 27, 2018

(54) METHODS FOR VEHICLE SPEED ACCURACY COMPENSATION

(71) Applicant: Ford Global Technologies, LLC, Dearborn, MI (US)

(72) Inventors: Michael McQuillen, Warren, MI (US); Daniel A. Makled, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/433,484

(22) Filed: Feb. 15, 2017

(65) Prior Publication Data

US 2018/0229729 A1    Aug. 16, 2018

(51) Int. Cl.
| | | |
|---|---|---|
| *B60W 30/18* | (2012.01) | |
| *B60W 30/188* | (2012.01) | |
| *B60K 31/00* | (2006.01) | |
| *B60K 35/00* | (2006.01) | |
| *B60L 15/20* | (2006.01) | |
| *B60W 40/105* | (2012.01) | |

(52) U.S. Cl.
CPC ....... *B60W 30/188* (2013.01); *B60K 31/0058* (2013.01); *B60K 35/00* (2013.01); *B60L 15/20* (2013.01); *B60W 40/105* (2013.01); *B60K 2350/1076* (2013.01); *B60K 2350/352* (2013.01); *B60W 2420/42* (2013.01); *B60W 2420/52* (2013.01); *B60W 2550/22* (2013.01); *B60W 2550/406* (2013.01); *B60W 2720/10* (2013.01); *B60Y 2300/188* (2013.01)

(58) Field of Classification Search
CPC ............. B60W 30/188; B60W 40/105; B60W 2550/406; B60W 2420/52; B60W 2420/42; B60W 2550/22; B60W 2720/10; B60L 15/20; B60K 31/0058; B60K 2350/352; B60K 2350/1076; B60Y 2300/188
See application file for complete search history.

(56) References Cited

U.S. PATENT DOCUMENTS

| | | | |
|---|---|---|---|
| 5,734,337 A | 3/1998 | Kupersmit | |
| 5,828,585 A | 10/1998 | Welk et al. | |
| 7,277,809 B1 | 10/2007 | De Witt, Jr. et al. | |
| 7,460,950 B2 | 12/2008 | Wurth | |
| 7,574,292 B2 | 8/2009 | Hoeffel et al. | |
| 8,612,088 B2 | 12/2013 | Milburn | |
| 8,874,345 B2 * | 10/2014 | Nandedkar | G06F 17/00 184/3.1 |
| 9,696,719 B2 * | 7/2017 | Aviel | G05D 1/0088 |
| 9,760,090 B2 * | 9/2017 | Shashua | G05D 1/0088 |
| 9,817,399 B2 * | 11/2017 | Braunstein | G05D 1/0088 |
| 2010/0121524 A1 | 5/2010 | Wheatley | |

(Continued)

*Primary Examiner* — Richard M Camby
(74) *Attorney, Agent, or Firm* — Julia Voutyras; McCoy Russell LLP

(57) ABSTRACT

A method and system for calibrating a speed displayed in a vehicle is provided. In one example, a method includes adjusting a determination of vehicle speed responsive to character recognition of an image from an on-board camera of the vehicle, the image including an external speed measurement source (such as a radar speed sign) displaying a speed measurement. The speed displayed in the vehicle may be corrected if the determined vehicle speed is outside of a threshold range generated from the speed measurement displayed on the external speed measurement source.

16 Claims, 2 Drawing Sheets

(56) References Cited

U.S. PATENT DOCUMENTS

2013/0049994 A1* 2/2013 Nicholson .............. G08G 1/052
340/936
2016/0189393 A1 6/2016 Rao et al.

\* cited by examiner

METHODS FOR VEHICLE SPEED ACCURACY COMPENSATION

FIELD

The present description relates generally to methods and systems for calibrating vehicle speed.

BACKGROUND/SUMMARY

Vehicle speed, as displayed on or by a vehicle speedometer, may be determined by a controller based on a number of revolutions of a wheel, as indicated by a wheel speed sensor positioned at each wheel of the vehicle, over a predetermined period of time. A distance traveled over one wheel revolution varies based on wheel size (e.g., diameter), with the distance traveled over one wheel revolution increasing as the wheel size increases. The wheel size is known by the manufacturer of the vehicle during vehicle assembly, and so the vehicle speed calculation may be pre-calibrated based on the known wheel size.

As regulated by federal law, vehicle speed accuracy must be within 2.5% of the actual vehicle speed. Accuracy of the vehicle speed calculation depends on the accuracy of the wheel speed sensors. However, wheel speed sensors are susceptible to degradation and aging, which may reduce accuracy. Further, the addition of custom wheels to the vehicle, which may be a different size, a change in tire pressure, and other factors may reduce vehicle speed accuracy so that it is not within 2.5% of the actual vehicle speed even if the wheel speed sensors are accurate.

Other attempts to address vehicle speed inaccuracy include using global positioning system (GPS) data to determine the distance traveled by a vehicle over time, which gives vehicle speed, to recalibrate the vehicle speed calculation. One example approach is shown by Wurth et al. in U.S. Pat. No. 7,460,950 B2. Therein, GPS data are used to generate a reference vehicle speed, which is compared to an estimated vehicle speed (as calculated from wheel speed sensor data) and used to generate a corrected vehicle speed.

However, the inventors herein have recognized potential issues with such systems. As one example, GPS data are too inaccurate to reliably give vehicle speed within the 2.5% accuracy margin. For example, GPS accuracy may be affected by factors including atmospheric effects, sky blockage, and GPS receiver quality. GPS data are also less reliable at lower speeds due to errors in determining a change in position.

In one example, the issues described above may be addressed by a method for adjusting a determination of speed of a motor vehicle responsive to character recognition of an image from an on-board camera of the vehicle, the image including a speed measurement source external to the vehicle. For example, the determination of vehicle speed may be based on output from wheel speed sensors of the vehicle, and the speed measurement source may be a radar speed sign. In this way, an accurate vehicle speed may be generated.

As one example, a vehicle equipped with an on-board camera and radar system may recognize traffic sign boards, such as a radar speed sign, through an image recognition module. A value displayed on the radar speed sign may be determined from an image acquired by the on-board camera and used as an independent measurement of the vehicle speed (e.g., as a reference speed). Further, the value displayed on the radar speed sign may be used to determine a compensation to apply to the vehicle speed calculated using wheel speed sensors of the vehicle, thereby increasing the accuracy of the calculated vehicle speed. Increasing the vehicle speed accuracy may increase vehicle performance and prevent a driver of the vehicle from receiving traffic citations due to speed limit violations. Further, the method described herein may also be utilized by autonomous vehicles to check and correct vehicle speed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
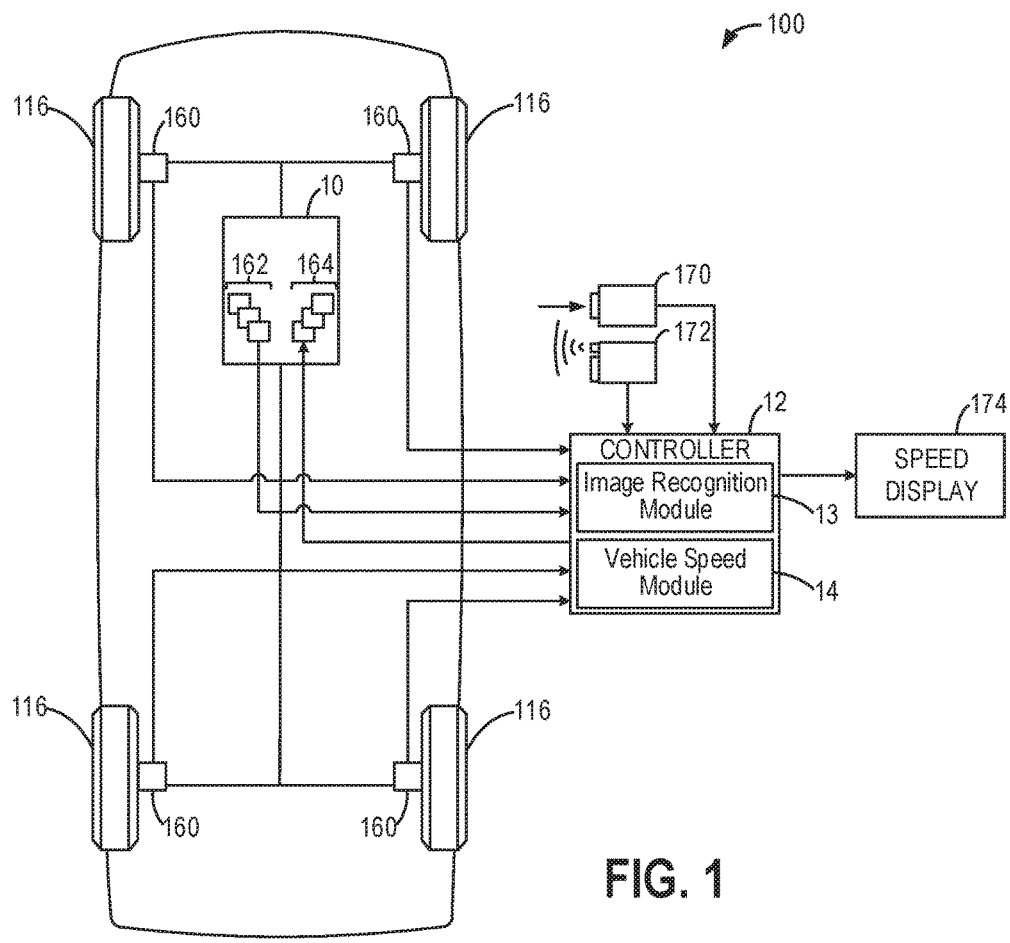
FIG. 1 is a schematic diagram of an example vehicle system.

The following description relates to systems and methods for increasing the accuracy of a vehicle speed displayed in a motor vehicle, such as the example vehicle shown in FIG. 1. The vehicle may recognize a radar speed sign, such as the example radar speed sign illustrated in FIG. 2, using an on-board camera and an image recognition module. The vehicle may compare a speed value displayed on the radar speed sign with a calculated vehicle speed (e.g., using wheel speed sensor output) and determine a compensation to apply to the calculated vehicle speed, for example, according to the method of FIG. 3.

Referring to FIG. 1, an exemplary system of a vehicle 100 is illustrated. The vehicle 100 includes an internal combustion engine 10, configured as a motor to propel the vehicle. Engine 10 may comprise a plurality of cylinders and may be controlled at least partially by a control system, including a controller 12. Vehicle 100 may further include a plurality of wheels 116, each having a wheel speed sensor 160. The wheel speed sensors 160 may be used to provide an indication of the current wheel speed of one or more vehicle wheels 116. Each wheel speed sensor 160 detects a rotational speed (e.g., a number of revolutions over time) of one of the wheels 116 and transmits the detected value to controller 12.

Vehicle 100 may also include an on-board camera 170 and a radar system 172. In a non-limiting example, on-board camera 170 and radar system 172 may be positioned near the front of vehicle 100 and pointed in a forward direction of travel so that objects in the vehicle path may be detected and determined, as described further below.

Controller 12 is shown receiving information from a plurality of sensors 162 and sending control signals to a plurality of actuators 164. As one example, controller 12 may receive various signals from sensors coupled to engine 10, in addition to those signals previously discussed, including: engine coolant temperature (ECT) from a temperature sensor; a measurement of engine manifold pressure (MAP)

from a pressure sensor coupled to an intake manifold of the engine; a crankshaft position from a Hall effect sensor (or other type) coupled to a crankshaft of the engine, from which engine speed (RPM) may be generated; a measurement of air mass entering the engine from a mass airflow (MAF) sensor; and a measurement of a throttle position from a throttle position (TP) sensor. Other sensors such as additional pressure, temperature, air/fuel ratio, and composition sensors may be coupled to various locations in the vehicle 100. As another example, the actuators may include fuel injectors for injecting fuel from a fuel system, and a throttle. In addition, controller 12 may receive data from a navigation device (GPS) and/or a vehicle-to-vehicle (V2V) network, such as an off-board cloud network.

Controller 12 may further receive data from on-board camera 170 and radar system 172. On-board camera 170 may be an infrared camera or a red, green, blue (RGB) detecting camera. In some examples, both infrared and RBG cameras may be provided. Radar system 172 may be a laser, radar, or sonic range determining device. On-board camera 170 and radar system 172 may include processors in communication with controller 12 to transmit and/or analyze data acquired by on-board camera 170 and radar system 172. For example, the on-board camera 170 may be programmed to detect the presence of another vehicle or object by using image recognition, as described further below, and direction of movement detection techniques. Similarly, radar system 172 may provide an indication of an object being detected as well as the distance to the object.

Controller 12 may house an image recognition module 13, which accesses stored images/videos (e.g., an image library) from one or more of a memory of the controller and a separate memory operatively coupled with controller 12. Image recognition module 13 may analyze images/videos captured by the on-board camera 170 in order to identify one or more features within each image. For example, image recognition module 13 may compare a live image of on-board camera 170 to one stored in a memory in order to identify objects in the live image, such as other cars or traffic signs, including a radar speed sign (such as radar speed sign 200 of FIG. 2). Further, image recognition module 13 may identify characters (e.g., letters and numbers) and words.

Additionally or alternatively, image recognition module 13 may use a model or algorithm stored within a memory of the controller, such as a shape detection algorithm, to recognize objects and characters. For example, image recognition module 13 may house both an image library and separate instructions for analyzing the displayed image/video apart from the image library, and both of these approaches may be used for object and character recognition. Further, controller 12 may house additional instructions for using the analyzed images. For example, a speed value determined from a radar speed sign using on-board camera 170 and image recognition module 13 may be compared to a speed calculated by controller 12 using a vehicle speed module 14, as described further with reference to FIG. 3.

Vehicle speed module 14 may be housed in controller 12 and may use outputs of the wheel speed sensors 160 to calculate vehicle speed. Vehicle speed may be shown on a speed display 174, which may include a speedometer, to inform a vehicle operator (e.g., a driver) of the current vehicle speed. The speed display 174 may also include a keyboard and a pointing device to obtain input from the driver. For example, the driver may input a new tire size or rim size on the speed display 174 when a custom wheel or a different tire size is installed, which may be stored in a memory of controller 12.

Controller 12 may also include a computer readable storage medium comprising instructions that may be executed to carry out one or more routines. The controller may receive input data from various sensors, such as those described herein, process the input data, and trigger the actuators in response to the processed input data based on instruction or code programmed therein corresponding to one or more routines. In one example, controller 12 is a single unit. In another example, controller 12 may include multiple operatively coupled units.

As used herein, the term "module" may include a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. Various modules, including image recognition module 13 and vehicle speed module 14, may represent the hardware that operates based on software or hardwired instructions, the software that directs hardware to perform the operations, or a combination thereof.

"Modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

Figure 2:
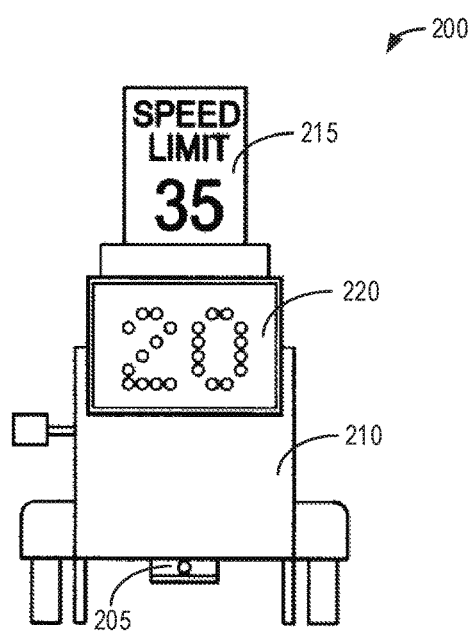
FIG. 2 shows an example of a radar speed sign.

Referring now to FIG. 2, an example of a radar speed sign 200 is shown. Radar speed sign 200 may be positioned along a roadway and may include a radar 205 for measuring a speed of an oncoming vehicle, a housing 210, a posted speed limit 215 for a particular road or highway, and a display system 220 for displaying the speed of the oncoming vehicle. Thus, the speed radar sign serves as a speed measurement source external to the oncoming vehicle. The speed of the oncoming vehicle may be displayed as a pulsed signal, typically emitted by light emitting diodes (LEDs) at, for example, a frequency of 80-160 Hertz (Hz). Radar speed sign 200 may be located on the right side of the road, in the case of right-hand traffic, or on the opposite side, in the case of left-hand traffic, and may be installed to create traffic awareness in areas such as school zones and residential areas. Radar speed signs such as radar speed sign 200 are calibrated to have a detection accuracy within a small margin of error (e.g., 1%) and can detect the speed of the oncoming vehicle within a range of 300 meters.

Figure 3:
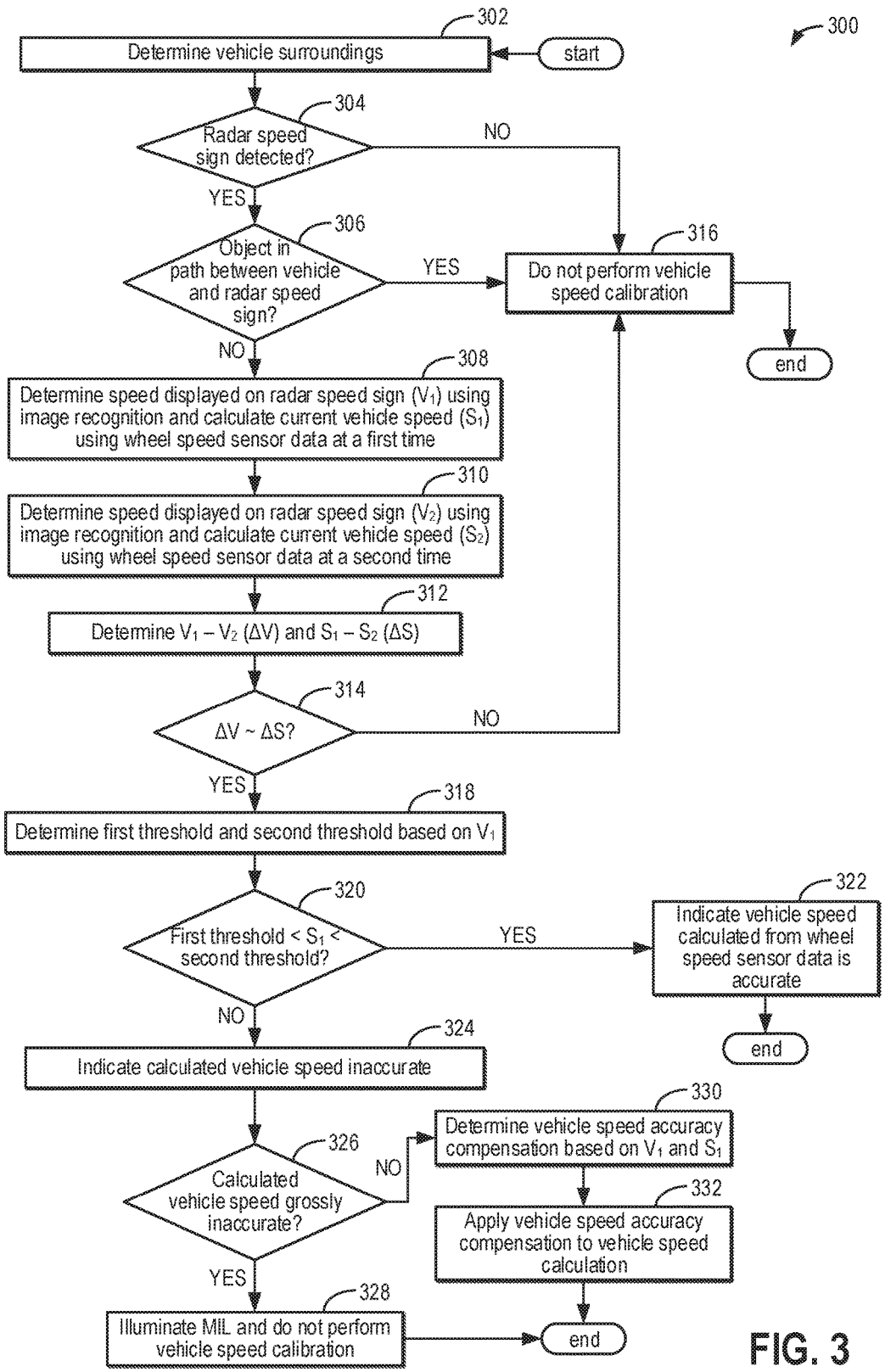
FIG. 3 is a flowchart of an example method for checking a calculated vehicle speed against a speed determined by a radar speed sign and applying a vehicle speed accuracy compensation to the calculated vehicle speed if the calculated vehicle speed is inaccurate.

Referring now FIG. 3, an example method 300 for determining the accuracy of a calculated speed of a vehicle, such as vehicle 100 of FIG. 1, based on a speed detected by a radar speed sign (e.g., radar speed sign 200 of FIG. 2) is shown. Further, a vehicle speed accuracy compensation may be applied if the calculated vehicle speed is determined to be inaccurate. Method 300 will be described with reference to the systems described and shown in FIGS. 1 and 2, although it should be understood that similar methods may be applied to other systems without departing from the scope of this disclosure. Instructions for carrying out method 300 may be executed by a controller, such as controller 12 of FIG. 1, based on instructions stored on a memory of the controller and in conjunction with signals received from sensors of the vehicle, such as the sensors described above with reference to FIG. 1 (e.g., wheel speed sensors 160) and may employ actuators of the vehicle according to the methods below.

Method 300 begins at 302 and includes determining vehicle surroundings. For example, an on-board camera (such as on-board camera 170 of FIG. 1) and/or a radar system (such as radar system 172 of FIG. 1) may be used to determine the vehicle surroundings, such as the distance to and identity of objects located within a travel path of the vehicle. The on-board camera and radar system may be activated by supplying power to the on-board camera and the radar system. In other examples, the on-board camera and the radar system may be activated responsive to engine start (e.g., a key-on event) and remain active while the engine on. The on-board camera may capture images in a forward direction of vehicle travel, for example.

At 304, it is determined whether a radar speed sign is detected. For example, using an image recognition module (e.g., image recognition module 13 of FIG. 1), the captured images may be compared with images of an image library to identify objects contained within the captured images. The radar speed sign may also be detected via an external signal, such as a radio frequency or microwave signal transmitted from the radar speed sign and received by an antenna of the vehicle, for example.

If a radar speed sign is detected, method 300 proceeds to 306. If a radar speed sign is not detected, method 300 continues to 316 and includes not performing a vehicle speed calibration. As such, it will not be determined if the calculated vehicle speed is accurate. Following 316, method 300 ends.

At 306, method 300 includes determining if an object is in the path between the vehicle and the radar speed sign. For example, the object may be a second vehicle, which may be located in the same lane or in a different lane of a multi-lane road. The object may be detected by the radar system and/or the on-board camera. For example, the radar system may emit a signal and determine the presence of an object based on a returned signal that is reflected by the object. In another example, the image recognition module may compare images presently captured by the on-board camera to stored images to determine if there is an object in the path between the vehicle and the radar speed sign. If there is an object in the path between the vehicle and the radar speed sign, method 300 proceeds to 316 and includes not performing the vehicle speed calibration, as described above. If there is an absence of an object between the vehicle and the radar speed sign, method 300 proceeds to 308.

At 308, method 300 includes determining a speed displayed on the radar speed sign ($V_1$) using image recognition and calculating a current vehicle speed ($S_1$) using wheel speed sensor data at a first time. For example, the image recognition module may analyze an image of the radar speed sign acquired by the on-board camera at the first time to determine the numerical value given on a display system (e.g., display system 220 of FIG. 2) of the radar speed sign, which serves as an external speed measurement. Simultaneously, the controller may calculate the current vehicle speed at the first time based on the output of the wheel speed sensors using a vehicle speed module (e.g., vehicle speed module 14 of FIG. 1). Thus, $V_1$ corresponds to a first speed value displayed on the radar speed sign, and $S_1$ corresponds to a first vehicle speed calculated using the vehicle speed module. Further, the controller may also execute a sanity check of the speed values $V_1$ and $S_1$. For example, the controller may compare $V_1$ and $S_1$ and determine if the numbers are within a predetermined range of each other, e.g., within 20 miles per hour (mph) of each other. If the values are not within the predetermined range of each other, the controller may reject $V_1$ and delay vehicle speed calibration. If the values are within the predetermined range, the values may be stored in the memory of the controller.

At 310, method 300 includes determining a speed displayed on the radar speed sign ($V_2$) using image recognition and calculating a current vehicle speed ($S_2$) using wheel speed sensor data at a second time, as described above. For example, the second time may be a predetermined duration (e.g., 3 seconds) after the first time. Thus, $V_2$ corresponds to a second speed value displayed on the radar speed sign and $S_2$ corresponds to a second vehicle speed calculated using the vehicle speed module. Further, $V_1$ and $S_1$ correspond to time-matched speed values determined through two independent means at the first time, and $V_2$ and $S_2$ correspond to time-matched speed values determined through two independent means at the second time. Again, the controller may execute the sanity check, as described above at 308, to determine if $V_2$ and $S_2$ are within the predetermined range. If both values are within the predetermined range, the values may be stored in the memory of the controller.

At 312, method 300 includes determining the difference between $V_1$ and $V_2$ ($\Delta V$) and the difference between $S_1$ and $S_2$ ($\Delta S$). Thus, $\Delta V$ corresponds to a change in the speed measured by the radar speed sign over the duration and $\Delta S$ corresponds to a change in the speed calculated using the vehicle speed module over the duration.

At 314, it is determined whether $\Delta V$ is approximately equal to $\Delta S$. For example, if the vehicle speed calculated using the vehicle speed module increases by 5 mph (e.g., $\Delta S \sim 5$), the speed measured by the radar speed sign is also expected to increase by approximately 5 mph (e.g., $\Delta V \sim 5$), even if the values measured by the radar speed sign are not identical to the values determined using the vehicle speed module. In another example, if the vehicle speed does not change, then $\Delta V$ and $\Delta S$ are both expected to be equal to zero. Therefore, determining that $\Delta V$ is approximately equal to $\Delta S$ may include determining that $\Delta S$ is within a predetermined threshold of $\Delta V$. Comparing $\Delta V$ and $\Delta S$ may ensure that the radar speed sign is updating responsive to the vehicle speed changing (e.g., the radar speed is functional). As another example, an inertial measurement unit (IMU) or vehicle accelerometer may be used to determine an acceleration or deceleration event, which may then be used to confirm $\Delta V$.

If $\Delta V$ is not approximately equal to $\Delta S$ (or the IMU or vehicle accelerometer data), method 300 proceeds to 316, and the vehicle speed calibration is not performed, as described above. If $\Delta V$ is approximately equal to $\Delta S$, method 300 proceeds to 318 and includes determining a first threshold and a second threshold based on $V_1$. The first threshold and the second threshold define a threshold range in which the calculated vehicle speed is considered to be accurate. The first threshold corresponds to a lower speed (e.g., a percentage less than $V_1$), and the second threshold corresponds to a higher speed (e.g., a percentage more than $V_1$). In one non-limiting example, the first threshold may be equal to a speed that is 2.5% less than $V_1$ and the second threshold may be equal to a speed that is 2.5% greater than $V_1$, such that any speed between the first and second thresholds is within 2.5% of $V_1$. Further, because radar speed signs are calibrated to be highly accurate, it may be assumed that $V_1$ is equal to the actual vehicle speed at the first time and is therefore used as a reference speed.

At 320, method 300 includes determining if $S_1$ is greater than the first threshold and less than the second threshold. If $S_1$, the vehicle speed calculated using the vehicle speed module at the first time, is greater than the first threshold and less than the second threshold, method 300 proceeds to 322 and includes indicating that the vehicle speed calculated from the wheel speed sensor data is accurate. Thus, the vehicle speed is confirmed, and the controller may continue to use the wheel speed sensor output and the vehicle speed module to calculate the vehicle speed without modifications. Following 322, method 300 ends.

If $S_1$ is not greater than the first threshold and less than the second threshold (e.g., it is outside of the threshold range), method 300 proceeds to 324 and includes indicating that the calculated vehicle speed is inaccurate. Responsive to the indication that the calculated vehicle speed is inaccurate, the controller may adjust the calculated vehicle speed, as described below.

At 326, method 300 includes determining if the calculated vehicle speed is grossly inaccurate (e.g., the calculated vehicle speed is more than a predetermined percentage outside of the threshold range defined by the first and second thresholds). For example, the vehicle speed may be considered grossly inaccurate if the error is beyond that which the controller is able to correct. If the calculated vehicle speed is determined to be grossly inaccurate, method 300 proceeds to 328 and includes illuminating a malfunction indicator lamp (MIL) and not performing the vehicle speed calibration. For example, the MIL may alert a vehicle operator to service the vehicle and may further include indicating the reason for the MIL.

If the calculated vehicle speed is not determined to be inaccurate, method 300 proceeds to 330 and includes determining a vehicle speed accuracy compensation based on $V_1$ and $S_1$. For example, an error correction algorithm may be applied to compute the vehicle speed accuracy compensation. In another example, the controller may refer a look-up table with $V_1$ (the reference vehicle speed) and $S_1$ (the determined vehicle speed) as inputs and the vehicle speed accuracy compensation as the output.

At 328, method 300 includes applying the vehicle speed accuracy compensation to the vehicle speed calculation. The vehicle speed accuracy compensation serves to correct the vehicle speed calculated from the wheel speed sensor output and may be applied by the vehicle speed module during the vehicle speed calculation to generate a corrected vehicle speed. The corrected vehicle speed may be displayed to the vehicle operator, for example, via a speedometer (e.g., speed display 174 of FIG. 1). Further, if the corrected vehicle speed is not equal to a desired vehicle speed (for example, as selected by the vehicle operator using cruise control or by the controller in an autonomous vehicle), the controller may adjust power output of the engine based on a difference between the desired vehicle speed and the corrected vehicle speed. For example, the controller may refer a look-up table with the difference between the desired vehicle speed and the corrected vehicle speed as the input and a change in the power output of the engine as the output. The controller may then adjust engine operating parameters, such as the air/fuel ratio, to generate the change in power output. Following 328, method 300 ends.

In this way, a determined speed of a vehicle (e.g., calculated using output from wheel speed sensors and a vehicle speed module) is confirmed or is corrected if determined to be inaccurate based on a reference speed from an external measurement source (e.g., a radar speed sign). Thus, the accuracy of the speed displayed to a driver is increased. Further, the vehicle speed may be calibrated without servicing the vehicle.

The technical effect of determining the accuracy of a calculated speed of a vehicle using a reference speed measured by a radar speed sign and applying a compensation to the speed calculation is that a speed displayed to a driver of the vehicle is corrected.

One example method comprises adjusting a determination of speed of a motor vehicle responsive to character recognition of an image from an on-board camera of the vehicle, the image including a speed measurement source external to the vehicle. In the preceding example, additionally or optionally, the determination of vehicle speed is based on output from wheel speed sensors positioned in the vehicle to measure a rotational speed of wheels of the vehicle. In any or all of the preceding examples, additionally or optionally, the speed measurement source is a radar speed sign. In any or all of the preceding examples, additionally or optionally, the method further comprises controlling power output of a motor propelling the vehicle based in part on the adjusted determination of vehicle speed. In any or all of the preceding examples, additionally or optionally, the power output of the motor is controlled to achieve a desired vehicle speed based in part on a difference between the desired vehicle speed and the adjusted determination of vehicle speed. In any or all of the preceding examples, additionally or optionally, adjusting the determination of vehicle speed includes adjusting a speed displayed on a speedometer of the vehicle.

Another example method comprises determining a speed of a motor vehicle based in part on output of sensors positioned on-board the vehicle; determining a reference speed of the vehicle based in part on on-board character recognition of a speed measurement source external to the vehicle; and correcting the determined vehicle speed when the determined vehicle speed is outside of a threshold range generated from the determined reference speed. In the preceding example, additionally or optionally, the vehicle speed is determined using a vehicle speed module and output from wheel speed sensors, and the reference speed is determined from a radar speed sign, the radar speed sign being identified using an on-board camera of the vehicle and an image recognition module. In any or all of the preceding examples, additionally or optionally, the threshold range is defined by a first, lower threshold and a second, higher threshold, with the first threshold being a percentage less than the determined reference speed and the second threshold being the percentage more than the determined reference speed. In any or all of the preceding examples, additionally or optionally, correcting the determined vehicle speed comprises determining a vehicle speed compensation based on the determined vehicle speed and the determined reference speed; and applying the vehicle speed compensation to the determined vehicle speed to generate a corrected vehicle speed. In any or all of the preceding examples, additionally or optionally, the corrected vehicle speed is displayed on a speedometer of the vehicle. In any or all of the preceding examples, additionally or optionally, the threshold range is generated from the determined reference speed responsive to an indication that the speed measurement source external to the vehicle is functional. In any or all of the preceding examples, additionally or optionally, determining that the speed measurement source external to the vehicle is functional comprises indicating an absence of an object between the vehicle and the speed measurement source external to the vehicle based on data from one or more of an on-board camera and an on-board radar system. In any or all of the preceding examples, additionally or optionally, determining that the speed measurement source external to the vehicle is functional further comprises determining a change in the vehicle speed over a duration; determining a change in the reference speed over the duration; and indicating that the speed measurement source external to the vehicle is functional responsive to the change in vehicle speed being within a predetermined threshold of the change in the reference speed.

In another example, a system for a vehicle comprises an engine configured to propel the vehicle; a plurality of wheels; wheel speed sensors configured to measure a number of revolutions over time of each of the wheels; a camera; a radar system; a speedometer; and a controller storing instructions in non-transitory memory that, when executed, cause the controller to: receive images captured by the camera and determine an external speed measurement in the images using an image recognition module; calculate vehicle speed using a vehicle speed module and output from the wheel speed sensors; and apply a vehicle speed compensation to the vehicle speed module responsive to the calculated vehicle speed being determined as inaccurate to generate a corrected vehicle speed. In the preceding example, additionally or optionally, determining the external speed measurement in the images further includes determining an absence of an object between the vehicle and a source of the external speed measurement based on data from the radar system. In the preceding example, additionally or optionally, the calculated vehicle speed being determined as inaccurate includes the calculated vehicle speed being outside of a threshold range determined from the external speed measurement, the calculated vehicle speed and the external speed measurement being time-matched speed values. In the preceding example, additionally or optionally, the vehicle speed compensation is determined from a difference of the calculated vehicle speed and the external speed measurement. In the preceding example, additionally or optionally, the corrected vehicle speed is displayed on the speedometer. In the preceding example, additionally or optionally, the controller further stores instructions in non-transitory memory that, when executed, cause the controller to: adjust a power output of the engine responsive to the calculated vehicle speed being determined as different from a desired vehicle speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a determination of speed of a motor vehicle responsive to character recognition of an image from an on-board camera of the vehicle, the image including a speed measurement source external to the vehicle, and controlling power output of a motor propelling the vehicle based in part on a difference between a desired vehicle speed and the adjusted determination of vehicle speed to achieve the desired vehicle speed.

2. The method of claim 1, wherein the determination of vehicle speed is based on output from wheel speed sensors positioned in the vehicle to measure a rotational speed of wheels of the vehicle.

3. The method of claim 1, wherein the speed measurement source is a radar speed sign.

4. The method of claim 1, wherein adjusting the determination of vehicle speed includes adjusting a speed displayed on a speedometer of the vehicle.

5. A method comprising:
determining a speed of a motor vehicle based in part on output of sensors positioned on-board the vehicle;
determining a reference speed of the vehicle based in part on on-board character recognition of a speed measurement source external to the vehicle; and
correcting the determined vehicle speed when the determined vehicle speed is outside of a threshold range, the threshold range generated from the determined reference speed responsive to an indication that the speed measurement source external to the vehicle is functional.

6. The method of claim 5, wherein the vehicle speed is determined using a vehicle speed module and output from wheel speed sensors, and the reference speed is determined from a radar speed sign, the radar speed sign being identified using an on-board camera of the vehicle and an image recognition module.

7. The method of claim 5, wherein the threshold range is defined by a first, lower threshold and a second, higher threshold, with the first threshold being a percentage less than the determined reference speed and the second threshold being a percentage more than the determined reference speed.

8. The method of claim 5, wherein correcting the determined vehicle speed comprises:
   determining a vehicle speed compensation based on the determined vehicle speed and the determined reference speed; and
   applying the vehicle speed compensation to the determined vehicle speed to generate a corrected vehicle speed.

9. The method of claim 8, wherein the corrected vehicle speed is displayed on a speedometer of the vehicle.

10. The method of claim 5, wherein determining that the speed measurement source external to the vehicle is functional comprises indicating an absence of an object between the vehicle and the speed measurement source external to the vehicle based on data from one or more of an on-board camera and an on-board radar system.

11. The method of claim 10, wherein determining that the speed measurement source external to the vehicle is functional further comprises:
   determining a change in the vehicle speed over a duration;
   determining a change in the reference speed over the duration; and
   indicating that the speed measurement source external to the vehicle is functional responsive to the change in vehicle speed being within a predetermined threshold of the change in the reference speed.

12. A system for a vehicle, comprising:
   an engine configured to propel the vehicle;
   a plurality of wheels;
   wheel speed sensors configured to measure a number of revolutions over time of each of the wheels;
   a camera;
   a radar system;
   a speedometer; and
   a controller storing instructions in non-transitory memory that, when executed, cause the controller to:
      receive images captured by the camera and determine an external speed measurement in the images using an image recognition module;
      calculate vehicle speed using a vehicle speed module and output from the wheel speed sensors; and
      apply a vehicle speed compensation to the vehicle speed module responsive to the calculated vehicle speed being outside of a threshold range determined from the external speed measurement, the calculated vehicle speed and the external speed measurement being time-matched speed values, to generate a corrected vehicle speed.

13. The system of claim 12, wherein determining the external speed measurement in the images further includes determining an absence of an object between the vehicle and a source of the external speed measurement based on data from the radar system.

14. The system of claim 12, wherein the vehicle speed compensation is determined from a difference of the calculated vehicle speed and the external speed measurement.

15. The system of claim 12, wherein the corrected vehicle speed is displayed on the speedometer.

16. The system of claim 12, wherein the controller further stores instructions in non-transitory memory that, when executed, cause the controller to:
   adjust a power output of the engine responsive to the calculated vehicle speed being determined as different from a desired vehicle speed.

* * * * *